United States Patent [19]

Gisske

[11] Patent Number: 4,568,864
[45] Date of Patent: Feb. 4, 1986

[54] ELECTRIC MOTOR CONTROL FOR A PIPE BENDER

[75] Inventor: Edward T. Gisske, Verona, Wis.

[73] Assignee: Ex-Cell-O Corporation, Troy, Mich.

[21] Appl. No.: 638,080

[22] Filed: Aug. 6, 1984

[51] Int. Cl.$^4$ .......................... H02P 1/22; H02P 3/12
[52] U.S. Cl. .................................... 318/294; 318/293;
318/345 C; 318/375
[58] Field of Search ...................... 363/125, 126, 128;
318/345 B, 345 C, 345 D, 345 G, 345 H, 375,
293, 294, 480

[56] References Cited

U.S. PATENT DOCUMENTS

| | | | |
|---|---|---|---|
| 4,319,171 | 3/1982 | Motoori | 318/379 |
| 4,323,833 | 4/1982 | Watanabe et al. | 318/345 G X |
| 4,432,034 | 2/1984 | Wohlert et al. | 363/128 X |
| 4,471,277 | 9/1984 | Franz, Jr. | 318/376 |

FOREIGN PATENT DOCUMENTS 2655077  6/1978  Fed. Rep. of Germany ... 318/345 G

Primary Examiner—William M. Shoop, Jr.
Assistant Examiner—Bentsu Ro
Attorney, Agent, or Firm—Edward J. Timmer

[57] ABSTRACT

A solid-state electronic control system for an electric motor which drives a pipe bending machine. A machine operator's hand switch acts through a logic system to cause the motor to run in either direction, and negates control conflicts.

The logic system controls an SCR bridge system to select the direction of D.C. energization of the motor for forward or reverse drive. This bridge system is supplied from A.C. mains through a bridge rectifier comprising three diodes and one SCR. When motor drive is called for, this SCR is made conducting to provide full-wave rectification. When motor drive is terminated, this SCR is turned off so that the rectifier becomes half-wave, which facilitates turn-off of the motor reversing SCR's.

A dynamic brake for the motor is turned on by a triac when motor energization is shut off.

2 Claims, 3 Drawing Figures

ELECTRIC MOTOR CONTROL FOR A PIPE BENDER

SUMMARY OF THE INVENTION

This invention is directed to improvements in control of electric motors. In particular, it is embodied in a system particularly suited to the requirements of power tools such as tubing benders. It provides for operation of a motor in either direction and for dynamic braking.

A particular advantage of the system lies in total use of solid-state electronic control, doing away with conventional electro-magnetic relays, which have long been a source of trouble in tubing bender controls.

My present system embodies electronic motor control which provides full-wave rectified reversible direct current to a motor during forward (bending) and reverse (unloading) movement and provides half-wave rectified current for motor turn-off.

The system further includes low-power electronic logic and interlock circuits to transmit signals from a machine operation control switch to the motor power controls. These are such as to ensure safe, rapid, and reliable operation.

The nature and advantages of the invention will be clear from the accompanying drawings and the detailed description of the preferred embodiment of the invention.

THE DRAWINGS

DETAILED DESCRIPTION

My invention is described as applied to a pipe bender commercially available such as the Greenlee 555 Electric Bender made by Greenlee Tool Co. of Rockford, Ill., a division of Ex-Cell-O Corporation. Details of the pipe bender are irrelevant to description of my control system.

Figure 1:
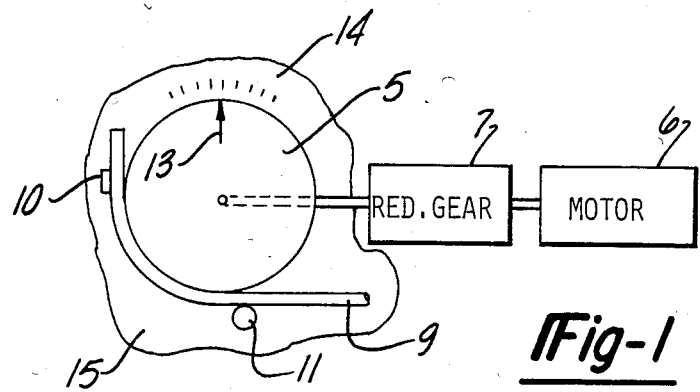
FIG. 1 is a schematic sketch of a pipe bender of known type.

Briefly, the bender (FIG. 1) includes a wheel or shoe 5 which is rotatable slowly by an electric motor 6 through a reduction gear 7. A pipe length 9 is held between the wheel 5 and a lug 10 and is guided over a support roller 11. The pipe is shown bent about 90°. An index 13 on the wheel and a scale 14 on the frame 15 of the machine indicate the angle of the bend. The wheel 5 is driven clockwise as shown to make the bend, and counterclockwise to release the workpiece, and return the bender to starting position.

Figure 2A:
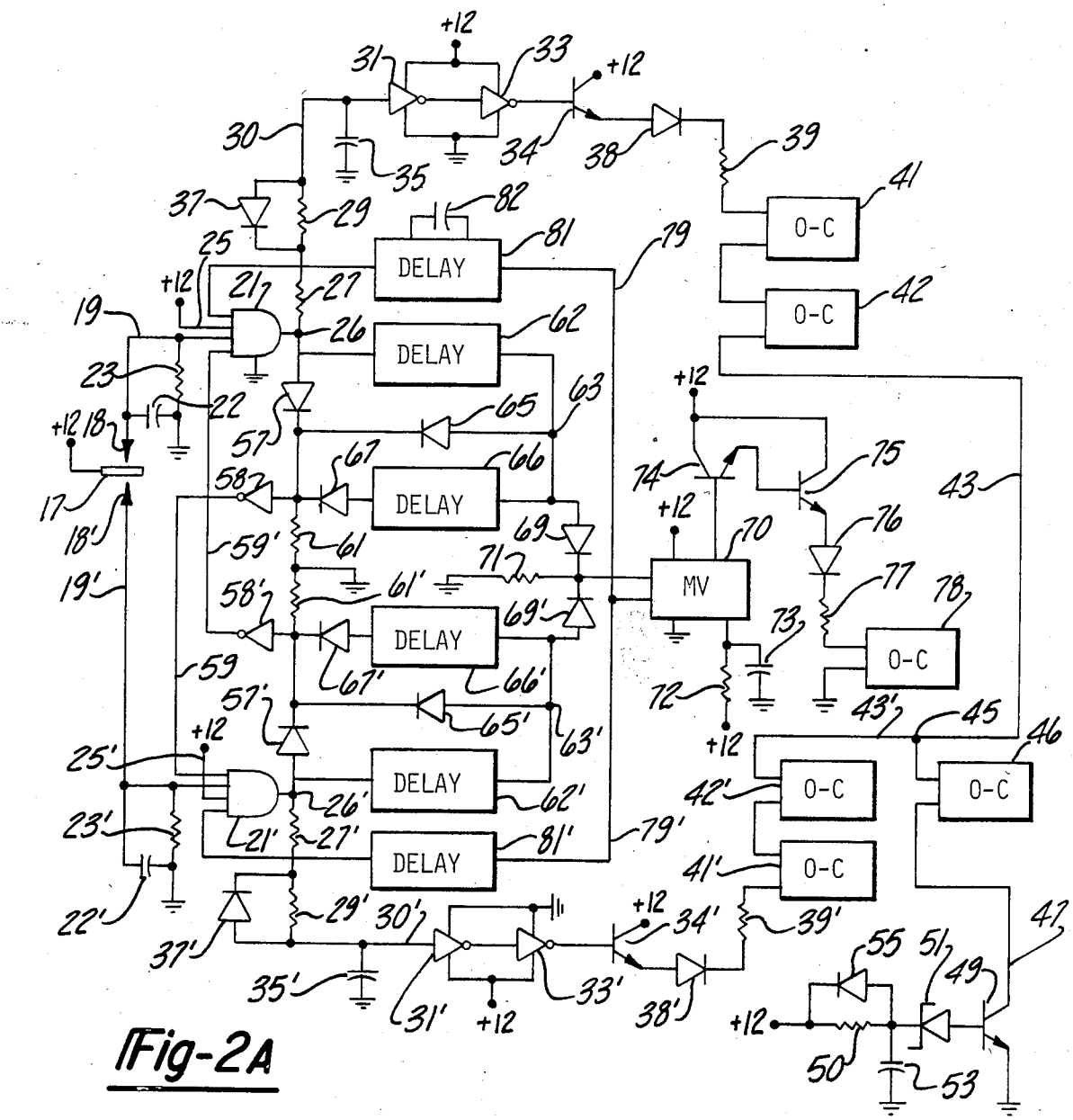
FIGS. 2a and 2b are a circuit diagram of the electrical control system.

Referring now to FIG. 2a, the machine operator uses a remote or pendant switch 17 to control the motor. This switch has a center open position and can transmit +12 V D.C. from a suitable source to a "bend" contact 18 or an "unload" contact 18'. Contact 18 is coupled through line 19 to a four-input AND gate 21, which may be one half of a Motorola integrated circuit type MC 14082. Line 19 is grounded through a noise-suppressing circuit of capacitor 22 and resistor 23. Plus 12 volts is fed to the AND gate from the source.

Gate 21 transmits a zero signal to junction 26 unless all its inputs are +. Assuming they are, a motor-energizing signal is transmitted through 2.2K resistor 27 and 2.7 megohm resistor 29 to line 30, which provides the input to series opamp inverters 31 and 33 which provide a turn-on signal to the base of an NPN transistor 34. Through circuits to be described, this transistor causes energization of motor 6. Line 30 is grounded through a 0.1 mfd capacitor 35 which, with resistor 29, provides a time delay in motor energization. A diode 37 shunting the resistor discharges the capacitor when junction 26 is returned to Zero.

When turned on, transistor 34 energizes a series circuit through a light-emitting diode (LED) 38, 150 ohm resistor 39, opto-couplers 41 and 42, and line 43 to a junction 45. This current energizes light-emitting diodes in the opto-couplers 41 and 42. The opto-couplers also include photo-detectors which are turned on by the radiation from the diodes. The opto-couplers 41 and 42 couple the low voltage logic circuits to the power control circuits to be described.

LED 38 is visible to the machine operator to indicate turn-on of the "bend" condition.

The circuit through opto-couplers 41 and 42 continues from junction 45 through the LED of an opto-coupler 46, line 47, and collector-emitter circuit of a transistor 49 to ground. This transistor is turned on after a time delay following initial energization of the 12 V D.C. control circuits to assure that the control energization is stable before operation of the motor control circuits. Plus 12 V is supplied through 4.7K resistor 50 and an IN753 Zener diode 51 to the base of transistor 49. A capacitor 53 (3.3 mfd) must charge to the Zener breakdown level before transistor 49 is turned on. Diode 55 discharges this capacitor when the 12 V control supply is turned off.

Returning to manual control switch 17, this is moved to energize contact 18' for reverse or "unload" operation of motor 6. This energizes a circuit to junction 45 identical to that described above. For conciseness, elements of this circuit are numbered as previously with the addition of primes. The LED 38' in this circuit indicates energization of the motor for "unload".

As is apparent, opto-coupler 46 is energized when the motor is ordered to operate in either direction. The reason for this will be seen.

Returning to the "bend" circuit, when it is turned on a + signal is transmitted at once from junction 26 through diode 57, inverting amplifier 58, and line 59 to one input of AND gate 21' to prevent reverse motor energization. Termination of this signal is delayed, as will be seen. Likewise, a signal is transmitted from gage 21' to gate 21 when "unload" is selected. The inputs of inverters 58 and 58' are grounded by 100 kilohm resistors 61 and 61'.

The "bend" control signal from AND gate 21 is conducted to the input of inverter 58 also through a delay device 62 to junction 63 and then through a diode 65, and also through a series circuit of delay device 66 and diode 67. These delay devices are known as Motorola type MC 14490 control bounce eliminators. Thus, gate 21' cannot turn on for a short time delay after gate 21 turns off. By the same sort of circuit, gate 21 is held off for a time after gate 21' turns off.

Junctions 63 and 63' are also connected, through diodes 69 and 69', to the triggering input (terminal 5) of a mono-stable multivibrator (MV) 70, Motorola type MC 14528, and to ground through 100K resistor 71. The MV is energized at its terminal 2 from +12 V through a 270K resistor 72 and grounded through 3.3 mfd capacitor 73. Output terminal 6 of the MV is connected to the base of a transistor 74. Transistor 74 controls a transistor 75 to complete a circuit from +12 V through LED 76, 150 ohm resistor 77, and the LED of an opto-coupler 78 to ground. As will be seen, this opto-coupler controls a brake for motor 6. The falling edge of the input to the MV 70 triggers the MV to energize the opto-coupler, and the MV establishes about a 2 second delay before de-energization of opto-coupler 78.

An inverted output (terminal 7) of the MV 70 returns a zero signal to the AND gates 21 and 21' to prevent energization of the motor after triggering of brake-controlling MV. This signal is transmitted through lines 79 and 79' and delay devices 81 and 81' to the remaining inputs of these gates. Thus, the motor cannot be reversed until about ½ sec. after de-energization, or while the brake circuit is operative.

A capacitor 82 of 22 mfd establishes the delay time of all the six delay devices 62,66,81, and so forth, which are parts of one multiple integrated circuit assembly.

The photo-diode 76 informs the machine operator that the motor brake is energized.

Figure 2B:
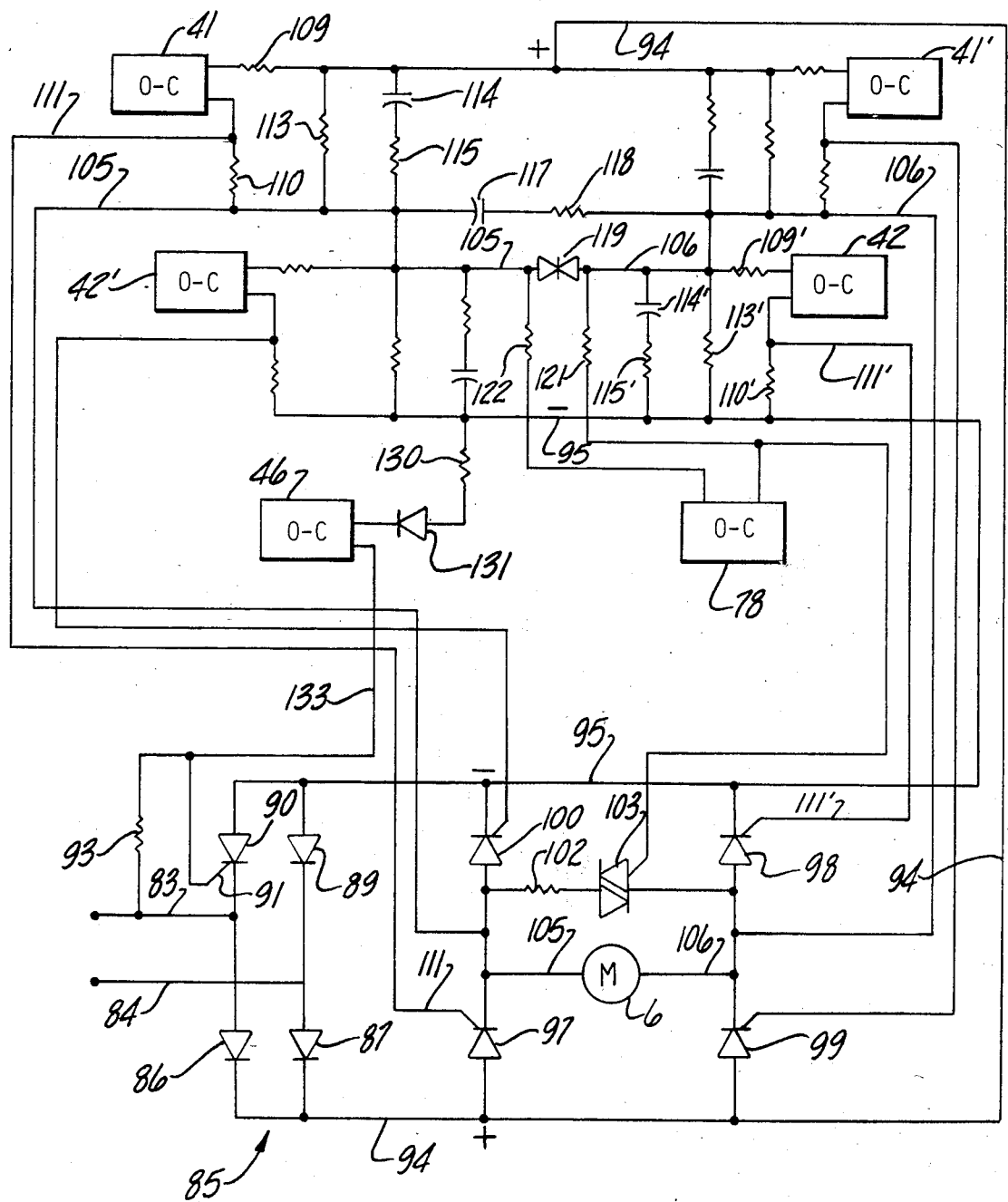

At this point we have described, the circuits by which the control switch 12 operates the six opto-couplers which control the motor power circuits, and the illumination of photo-diodes 38,38', and 76 to inform the machine operator. We may now refer to FIG. 2b for the motor power circuits including solid-state relays and triggering circuits for them.

The motor 6 is of a permanent-magnet field D.C. type. Power is supplied from 120 V A.C. lines 82 and 84 to a full-wave rectifier 85. This rectifier is a circuit comprising four rectifiers in the usual bridge configuration. Rectifiers 86, 87, and 89 are diodes. The fourth rectifier 90 is a silicon-controlled rectifier (SCR) which is non-conducting unless turned on at its gate electrode 91, which is connected to the A.C. input through a 1K resistor 93.

Rectifier 85 energizes a plus D.C. bus 94 and a negative D.C. bus 95. Motor 6 is reversibly energizable from these buses through a set of four silicon controlled rectifiers 97, 98, 99, and 100. When SCR's 97 and 98 are caused to conduct, current flows through the motor in one direction to bend the conduit. When 99 and 100 conduct, motor current is reversed to unload the bender. It will be seen that these SCR's are in a bridge circuit.

To brake the motor, it is shunted through a one ohm 50 watt resistor 102 by a triac 103. This triac may conduct in either direction under control of its gate electrode. Motor power input lines are identified as 105 and 106.

The gate electrodes of triac 103 and the five SCR's are controlled by circuits coupled to the circuits of FIG. 2a by the six opto-couplers. These isolate the logic circuits electrically from the power circuits. Opto-couplers 41, 41', 42, 42', 46, and 78 are shown also on FIG. 2b. This may be construed to represent the responding portion on photo-detector of each. Specifically, the preferred photo-detector is a photo-transistor, which is turned on by illumination from the corresponding LED.

Considering details of the motor control, opto-coupler 41 is connected between plus D.C. bus 94 and on motor bus 105, coupler 41' between bus 94 and the other motor bus 106, coupler 42 between negative DC bus 95 and bus 106, and coupler 42' between buses 95 and 106. All are similarly connected. The photo-detector of 41 is energized from bus 94 through 47 ohm resistor and connected to bus 105 through 1K resistor 110. A lead 111 connects to the gate of SCR 97. Thus this SCR is turned on by positive bias on its gate when the coupler 41 conducts. The circuit through the coupler is shunted by 2.2K resistor 113 and by 0.1 mfd capacitor 114 in series with 10 ohm resistor 115.

Opto-coupler 42 is similarly connected, as indicated by the primed reference numerals. As pointed out above, the LED's of these couplers are simultaneously energized, so that when the conduct, SCR's 97 and 98 are biased to conduct, and the motor is driven in the "bend" direction by flow from line 105 to line 106.

On the other hand, when the LED's of couplers 41' and 42' are energized, they cause the photo-transistors of these couplers to bias SCR's 99 and 100 to conduct, reversing current through the motor 6 to drive it in the "unload" direction.

Buses 105 and 106 are interconnected through a 0.1 mfd capacitor 117 and 10 ohm resistor in series. This circuit acts as a snubber to reduce rate of change of voltage between the two buses. They are also interconnected by a metal oxide thyristor 119 for transient voltage protection.

When the manual control switch 17 (FIG. 2a) is released, flow of current to motor 6 is interrupted, and the circuit including multivibrator 70 energizes opto-coupler 78. This coupler triggers triac 103 (FIG. 2b) to shunt the motor through resistor 102 and thus brake it. The gate of the triac is coupled to motor bus 106 at all times through 1K resistor 121. Coupler 78, when conducting, completes a circuit from this gate through a 330 ohm resistor 122 to the remote motor bus 105, to cause the triac to conduct. The triac conducts in either direction. Kinetic energy of the motor is absorbed in the resistance of the path through the motor and resistor 102 to brake the motor. After a period determined by the multivibrator 70, the coupler 78 is de-energized and, upon decay of voltage across the triac 103, the motor shunt is opened. The AND gates 21 and 21' now enable re-energization of the motor.

The opto-coupler 46 controls SCR 90, which is one of the four rectifiers making up the bridge rectifier circuit 85. SCR 90 conducts when its anode is sufficiently positive and its gate 91 is biased positively. When the coupler is non-conduction, gate 91 follows the potential of line 83 and the cathode of SCR 90 by conduction through 1K resistor 93. The SCR remains non-conducting.

Opto-coupler 46 becomes conducting when the motor 6 is energized to drive in either direction, since its LED is connected in series with those of couplers 41, 42, 41', and 42. Gate 91 is then coupled to negative DC bus 95 through 47 ohm resistor 130, diode 131, the photo-transistor of the coupler 46, and a line 133. In the half-cycle when line 83 goes negative with respect to bus 95, gage 91 is biased positively and the SCR conducts.

The result is that DC power is supplied through a full-wave rectifier when the motor is driven, and through a half-wave rectifier when it is being deenergized and braked. The resulting interruption of DC power for one half-cycle during each cycle of A.C. power is of great value in improving commutation or turn-off of motor energizing SCR's 97 and 98, or 99 and 100, as the case may be.

It will be apparent to those skilled in the art that the control system, the preferred embodiment of which has been described, will provide smooth operation of the bending machine, and eliminate the many problems resulting from the use of conventional electro-magnetic relays.

I claim:

1. A power control system for a D.C. electric motor energized from an A.C. power supply comprising, in combination, a solid-state electronic rectifier energizable from an A.C. source, the rectifier comprising four unidirectional conducting devices in bridge configuration, at least one of which is controllable between conducting and non-conducting states, so that the rectifier operates as a full wave or half-wave rectifier accordingly; positive and negative D.C. lines energized by the rectifier, and gate-controlled rectifiers in bridge configuration connecting the said D.C. lines to the motor so that the motor may be deenergized, or energized with either polarity for operation in either direction with the half-wave rectified A.C. power output from said rectifier providing a half-cycle interruption in power to said gate-controlleds rectifiers to facilitate their turn off when the motor is being deenergized; and control means effective to operate the said rectifier as a full-wave rectifier when the motor is energized and a half-wave rectifier when motor energization is terminated.

2. A power control system as recited in claim 1 including also a dynamic brake for the motor including a braking resistor and a triac operable to shunt the resistor across the motor, and including means effective to render the triac conducting when motor energization is terminated.

* * * * *